United States Patent
Mishra et al.

(10) Patent No.: US 7,496,919 B1
(45) Date of Patent: Feb. 24, 2009

(54) METHOD TO SUPPORT ROLE BASED PRIORITIZATION OF PROCESSES

(75) Inventors: Rajeev Mishra, Karnataka (IN); Vijaya S. Mekala, Andhra Pradesh (IN); Suresh Sabarathinam, Austin, TX (US); Edward Shvartsman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/133,207

(22) Filed: Jun. 4, 2008

(51) Int. Cl.
G06F 9/46 (2006.01)
(52) U.S. Cl. .............. 718/103; 718/102; 718/104; 718/106; 718/107; 705/8; 705/9
(58) Field of Classification Search ......... 718/100–107; 705/8–9
See application file for complete search history.

(56) References Cited

U.S. PATENT DOCUMENTS

| | | | |
|---|---|---|---|
| 6,088,679 A * | 7/2000 | Barkley ..................... | 705/8 |
| 6,338,072 B1 * | 1/2002 | Durand et al. ............. | 707/205 |
| 6,584,488 B1 * | 6/2003 | Brenner et al. ............ | 718/103 |
| 2005/0183086 A1 * | 8/2005 | Abe et al. .................. | 718/100 |
| 2006/0136922 A1 * | 6/2006 | Zimberg et al. ........... | 718/100 |
| 2007/0011485 A1 | 1/2007 | Oberlin et al. | |
| 2007/0136731 A1 * | 6/2007 | Bennington et al. ....... | 718/103 |
| 2008/0040457 A1 * | 2/2008 | Nygard ...................... | 709/220 |
| 2008/0052716 A1 | 2/2008 | Theurer | |

* cited by examiner

Primary Examiner—Lewis A. Bullock, Jr.
Assistant Examiner—Jennifer N To
(74) Attorney, Agent, or Firm—Morgan & Finnegan LLP

(57) ABSTRACT

A method is disclosed to assign Priority to Processes based on Roles. The method calculates the process priority of the process using a scheduler running in the computer system, based on either a first weight of a first role, a second weight of a second role, or a calculated weight if both the first and second roles can unlock access to the process. The method then assigns a share of the computer system's time to the process, the share of time being based on the process priority calculated for the process.

1 Claim, 2 Drawing Sheets

METHOD TO SUPPORT ROLE BASED PRIORITIZATION OF PROCESSES

FIELD

The embodiments relate to supporting role based prioritization of computer processes.

BACKGROUND

Computer-based access controls can limit which users or processes may have access to a specific system resource and the type of access permitted. The access decisions in Role-Based Access Control (RBAC) are based on the roles that individual users have as part of an organization. Users take on assigned roles (such as system administrator, project manager, design engineer, or part-time employee, etc.) Access rights are grouped by role name, and the use of resources is restricted to individuals authorized to assume the associated role. For example, a system administrator can access user authentication data for an entire organization, whereas the role of a project manager can be limited to information associated with that particular project, and not to information associated with other projects.

A program or command that is actually running on the computer is referred to as a process. When a process is started on a system, the process uses a part of the available system resources. When more than one process is running, a scheduler that is built into the operating system gives each process its share of the computer's time, based on established priorities.

In Role Based Access Control (RBAC), what is needed is a way to control the priority of the running processes based on roles. For example, a system has two roles: "Security Administration" and "Backup Administration". A set of authorizations has been assigned to these roles. If there is a requirement to give more priority to the "Security Administration" role, i.e. more priority is to be given to the commands (processes) that a Security Administration executes on the system, then the "Backup Administration" role should be given a lesser priority than the "Security Administration" role. These priorities are required since "Security Administration" commands are considered more important and the person exercising that role needs more priority for his commands then a person exercising the "Backup Administration" role.

What is needed is a way to assign priority of a process in accordance with the role of the person accessing that process. In other words the priority of the process needs to be set based on the role that a user has, i.e. prioritize processes based on the roles with which they are associated. What is needed is a method to assign priority to processes based on roles.

SUMMARY

A method is disclosed to assign Priority to Processes based on Roles. The method includes storing first role data representing a first role, comprising a first set of authorizations to unlock access to a process running in a computer system, the first role having a first weight. The method then continues by storing second role data representing a second role, comprising a second set of authorizations to unlock access to the process running in the computer system, the second role having a second weight. The method then continues by selecting a process weight for the process from the group consisting of the first weight of the first role, the second weight of the second role, and a calculated weight based on the first and second weights. The method then continues by calculating a process priority of the process, using a scheduler running in the computer system, based on the first weight, if the first role data is to unlock access to the process. The method then continues by calculating the process priority of the process, using the scheduler running in the computer system, based on the second weight, if the second role data is to unlock access to the process. The method then continues by calculating the process priority of the process, using the scheduler running in the computer system, based on either the first weight, the second weight, or the calculated weight, if the first and second role data can unlock access to the process. Finally, the method then continues by assigning a share of the computer system's time to the process, the share of time being based on the process priority calculated for the process.

DISCUSSION OF EXAMPLE EMBODIMENTS OF THE INVENTION

Figure 1:
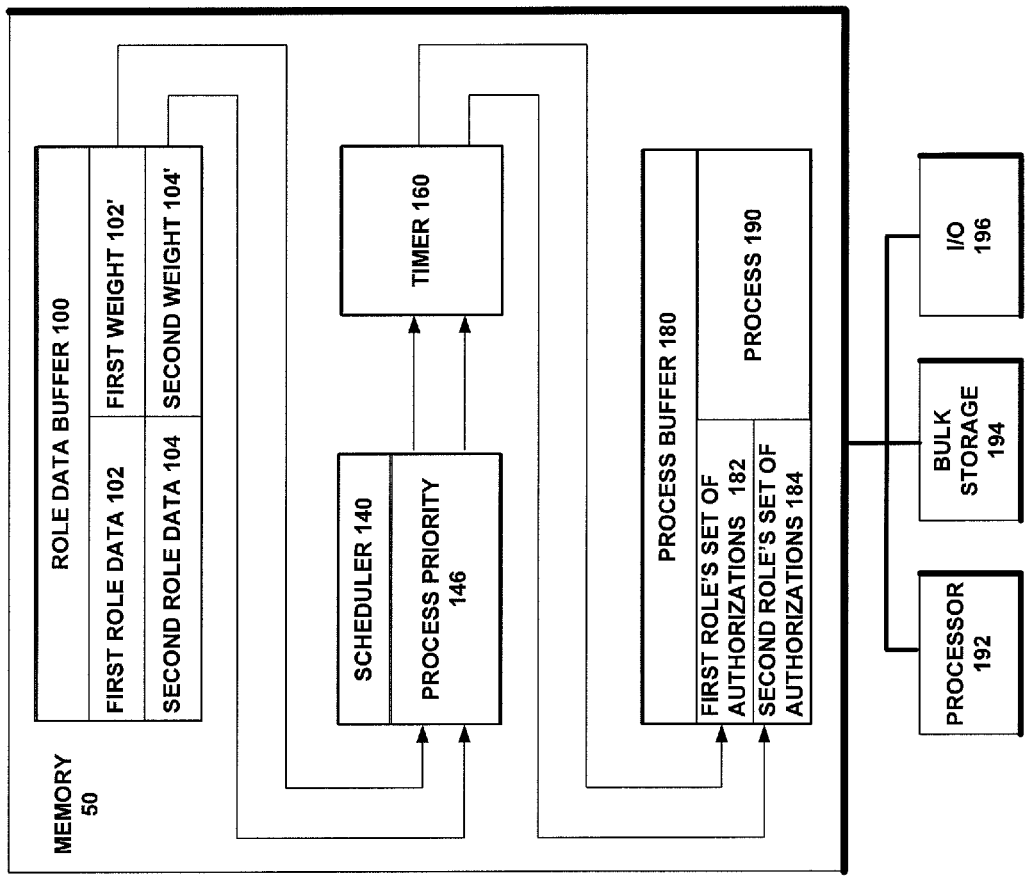
FIG. 1 is a functional block diagram of a computer system that performs role based prioritization of computer processes.

FIG. 1 is a functional block diagram of a computer system that performs role based prioritization of computer processes. The computer system includes a memory 50, processor 192, bulk storage 194, and input/output interface 196 connecting the computer system to communication networks, other processors, and various user input and output devices. The role data buffer 100 in memory 50 stores first role data 102 representing a first role. The first role data 102 includes a first set of authorizations 182 in the memory 50 to unlock access to a process 190 running in the memory 50 of the computer system and being executed by the processor 192. The first role has a first weight 102' stored in the role data buffer 100.

The role data buffer 100 in memory 50 stores second role data 104 representing a second role. The second role data 104 includes a second set of authorizations 184 in the memory 50 to unlock access to the process 190 running in the memory 50 of the computer system. The second role has a second weight 104' stored in the role data buffer 100.

The processor 192, under program control, selects a process weight for the process 190 from the group consisting of the first weight 102' of the first role, the second weight 104' of the second role, and a calculated weight based on the first and second weights, 102' and 104'.

The processor 192, under program control, calculates a process priority 146 of the process 190, using a scheduler 140 running in the memory 50 of the computer system, based on the first weight 102', if the first role data 102 is to unlock access to the process 190.

The processor 192, under program control, calculates the process priority 146 of the process 190, using the scheduler 140 running in the memory 50 of the computer system, based on the second weight 104', if the second role data 104 is to unlock access to the process 190.

The processor 192, under program control, calculates the process priority 146 of the process 190, using the scheduler 140 running in the memory 50 of the computer system, based on either the first weight 102', the second weight 104', or the calculated weight of weights 102' and 104', if both the first and second role data 102 and 104 can unlock access to the process 190.

The timer 160 then assigns a share of the computer system's time to the process 190, the share of time being based on the process priority 146 calculated for the process 190.

More generally, the process priority 146 of the process 190 will be calculated according to the roles authorized to access it. Each role will have a weight, for example 102', assigned to it. If a process 190 is associated with multiple roles, the system administrator will have the flexibility as how he/she wants to calculate process priority 146 of the process 190 based on the various weights 102', 104', etc. of the associated roles. The system administrator can choose the following example policy to calculate the process weight for the process 190 in case the process is associated with multiple roles:

Best weight:-Best weight from the set of roles will be used.

Least weight:-Least weight from the set of roles will be used.

Average weight:-An average is calculated of all the weight.

The system administrator will be able to assign a weight to each role. This weight will be used by the scheduler 140 to calculate the priority 146 of the process. To implement the role based priority, a default role will be created on the system and it will have a weight of zero. All the processes 190 on the system will have this default role. This default role will have a minimum set of authorizations associated with it.

For example, the system administrator-defined weight for each role on the system is:

| Roles | Weight priority |
| --- | --- |
| Default | 0 |
| Backup | 10 |
| Security | 15 |
| XYZ | 1 |

Suppose a process 190 is running with a Backup role, then it will have a weight of 10 and the scheduler 140 will use this weight to assign priority 146 to the process. Alternately, if a process 190 has multiple roles, then processor 192, under program control, calculates process weight for the process 190 according to the policy specified by the system administrator. For example if a process 190 is running with backup and XYZ roles then the Best weight policy will give this process a weight of 10. The Least weight policy will give this process a weight of 1 (the XYZ role has a weight of 1). And, the average weight policy will give this process a weight of 5.5. This process weight is then used by the scheduler 140 to calculate the process priority 146. The above policy does not use Default class for calculation, since it does not have any weight.

Figure 2:
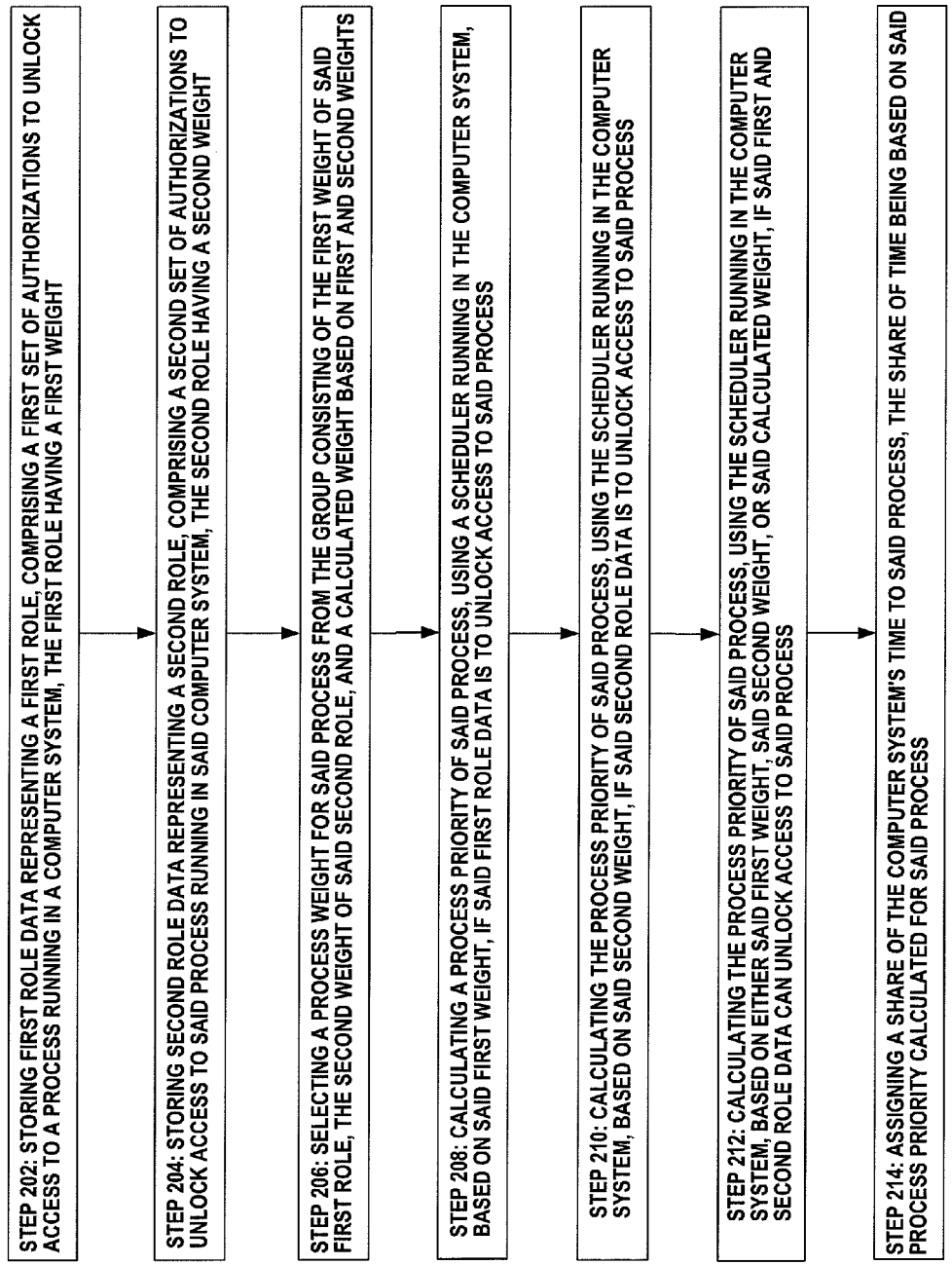
FIG. 2 is an example flow diagram of an example embodiment for the sequence of steps carried out by the computer system of FIG. 1.

FIG. 2 is an example flow diagram of an example embodiment for the sequence of steps carried out by the computer system of FIG. 1.

Step 202 is storing first role data representing a first role, comprising a first set of authorizations to unlock access to a process running in a computer system, the first role having a first weight.

Step 204 is storing second role data representing a second role, comprising a second set of authorizations to unlock access to said process running in said computer system, the second role having a second weight.

Step 206 is selecting a process weight for said process from the group consisting of the first weight of said first role, the second weight of said second role, and a calculated weight based on said first and second weights.

Step 208 is calculating a process priority of said process, using a scheduler running in the computer system, based on said first weight, if said first role data is to unlock access to said process.

Step 210 is calculating the process priority of said process, using the scheduler running in the computer system, based on said second weight, if said second role data is to unlock access to said process.

Step 212 is calculating the process priority of said process, using the scheduler running in the computer system, based on either said first weight, said second weight, or said calculated weight, if said first and second role data can unlock access to said process.

Step 214 is assigning a share of the computer system's time to said process, the share of time being based on said process priority calculated for said process.

In this manner, the method to assigns Priority to Processes based on Roles.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments.

Although specific example embodiments have been disclosed, a person skilled in the art will understand that changes can be made to the specific example embodiments without departing from the spirit and scope of the invention.

What is claimed is:

1. A method, comprising:

storing first role data representing a first role, comprising a first set of authorizations to unlock access to a process running in a computer system, the first role having a first weight;

storing second role data representing a second role, comprising a second set of authorizations to unlock access to said process running in said computer system, the second role having a second weight;

selecting a process weight for said process from the group consisting of the first weight of said first role, the second weight of said second role, and a calculated weight based on said first and second weights;

calculating a process priority of said process, using a scheduler running in the computer system, based on said first weight, if said first role data is to unlock access to said process;

calculating the process priority of said process, using the scheduler running in the computer system, based on said second weight, if said second role data is to unlock access to said process;

calculating the process priority of said process, using the scheduler running in the computer system, based on either said first weight, said second weight, or said calculated weight, if said first and second role data can unlock access to said process; and assigning a share of the computer system's time to said process, the share of time being based on said process priority calculated for said process.

* * * * *